US 9,139,190 B2

United States Patent
Oki et al.

(10) Patent No.: US 9,139,190 B2
(45) Date of Patent: Sep. 22, 2015

(54) APPARATUS FOR CONTROLLING VEHICLE AND METHOD FOR CONTROLLING VEHICLE

(71) Applicant: HONDA MOTOR CO., LTD., Tokyo (JP)

(72) Inventors: Hideyuki Oki, Wako (JP); Toshiaki Ichoda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/191,434

(22) Filed: Feb. 27, 2014

(65) Prior Publication Data

US 2014/0257652 A1    Sep. 11, 2014

(30) Foreign Application Priority Data

Mar. 11, 2013   (JP) .................................. 2013-047477

(51) Int. Cl.
| | |
|---|---|
| *B60W 10/06* | (2006.01) |
| *B60W 10/107* | (2012.01) |
| *B60W 50/035* | (2012.01) |
| *B60W 10/11* | (2012.01) |
| *B60W 30/18* | (2012.01) |
| *F02D 41/12* | (2006.01) |
| *F16H 61/21* | (2006.01) |
| *B60W 50/029* | (2012.01) |

(52) U.S. Cl.
CPC .............. *B60W 10/06* (2013.01); *B60W 10/11* (2013.01); *B60W 30/18136* (2013.01); *B60W 50/035* (2013.01); *F02D 41/123* (2013.01); *F16H 61/21* (2013.01); *B60W 2050/0295* (2013.01); *B60W 2710/0627* (2013.01); *B60W 2710/1005* (2013.01); *F02D 2200/101* (2013.01); *F02D 2200/501* (2013.01)

(58) Field of Classification Search
None
See application file for complete search history.

(56) References Cited

U.S. PATENT DOCUMENTS

| | | | | | |
|---|---|---|---|---|---|
| 5,393,278 | A | * | 2/1995 | Kyushima et al. | ............ 477/120 |
| 5,473,544 | A | * | 12/1995 | Yamashita | ....................... 701/86 |
| 6,104,976 | A | * | 8/2000 | Nakamura | ....................... 701/95 |
| 6,335,573 | B1 | * | 1/2002 | Eguchi et al. | ............... 290/40 C |

FOREIGN PATENT DOCUMENTS

JP     2003-341387     12/2003

* cited by examiner

*Primary Examiner* — Ramya Burgess
*Assistant Examiner* — David Morris
(74) *Attorney, Agent, or Firm* — Mori & Ward, LLP (57) ABSTRACT

An apparatus for controlling a vehicle includes a target rotational speed calculator, a transmission controller, a fuel supply stop controller, and an inhibition controller. The target rotational speed calculator is configured to calculate a target rotational speed of an internal combustion engine in accordance with a drive condition of the vehicle. The transmission controller is configured to change a transmission gear ratio of an automatic transmission so that a rotational speed of an output shaft of the internal combustion engine approaches the target rotational speed. The output shaft of the internal combustion engine is connected to the automatic transmission via a transfer mechanism. The fuel supply stop controller is configured to stop supplying fuel to the internal combustion engine if a predetermined fuel supply stop condition is satisfied during deceleration of the vehicle.

13 Claims, 3 Drawing Sheets

APPARATUS FOR CONTROLLING VEHICLE AND METHOD FOR CONTROLLING VEHICLE

CROSS-REFERENCE TO RELATED APPLICATIONS

The present application claims priority under 35 U.S.C. §119 to Japanese Patent Application No. 2013-047477, filed Mar. 11, 2013, entitled "Apparatus for Controlling Vehicle." The contents of this application are incorporated herein by reference in their entirety.

BACKGROUND

1. Field

The present disclosure relates to an apparatus for controlling a vehicle and a method for controlling a vehicle.

2. Description of the Related Art

Japanese Unexamined Patent Application Publication No. 2003-341387 describes an apparatus for controlling a vehicle including a drive mechanism that transfers the output of an internal combustion engine to a drive wheel via a start clutch and a continuously variable transmission. According to the control apparatus, if the engine speed (the rotational speed of the input shaft of the start clutch) is lower than the rotational speed of the output shaft of the start clutch by a predetermined value or greater for a predetermined period of time or longer, driving in a fuel cutoff mode is inhibited. Thus, an excessive drop of the engine speed can be prevented.

SUMMARY

According to one aspect of the present invention, an apparatus for controlling a vehicle includes a target rotational speed calculator, a transmission controller, a fuel supply stop controller, and an inhibition controller. The target rotational speed calculator is configured to calculate a target rotational speed of an internal combustion engine in accordance with a drive condition of the vehicle. The transmission controller is configured to change a transmission gear ratio of an automatic transmission so that a rotational speed of an output shaft of the internal combustion engine approaches the target rotational speed. The output shaft of the internal combustion engine is connected to the automatic transmission via a transfer mechanism. The fuel supply stop controller is configured to stop supplying fuel to the internal combustion engine if a predetermined fuel supply stop condition is satisfied during deceleration of the vehicle. The inhibition controller is configured to control the fuel supply stop controller to inhibit stoppage of fuel supply to be performed by the fuel supply stop controller if the stoppage of fuel supply is to be a predetermined short-time stoppage that lasts a predetermined short time.

According to another aspect of the present invention, in a method for controlling a vehicle, a target rotational speed of an internal combustion engine is calculated in accordance with a drive condition of the vehicle. A transmission gear ratio of an automatic transmission is changed so that a rotational speed of an output shaft of the internal combustion engine approaches the target rotational speed. Supplying fuel to the internal combustion engine is stopped if a predetermined fuel supply stop condition is satisfied during deceleration of the vehicle. The stopping supplying fuel is inhibited if the stopping supplying fuel is to be a predetermined short-time stoppage that lasts a predetermined short time.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
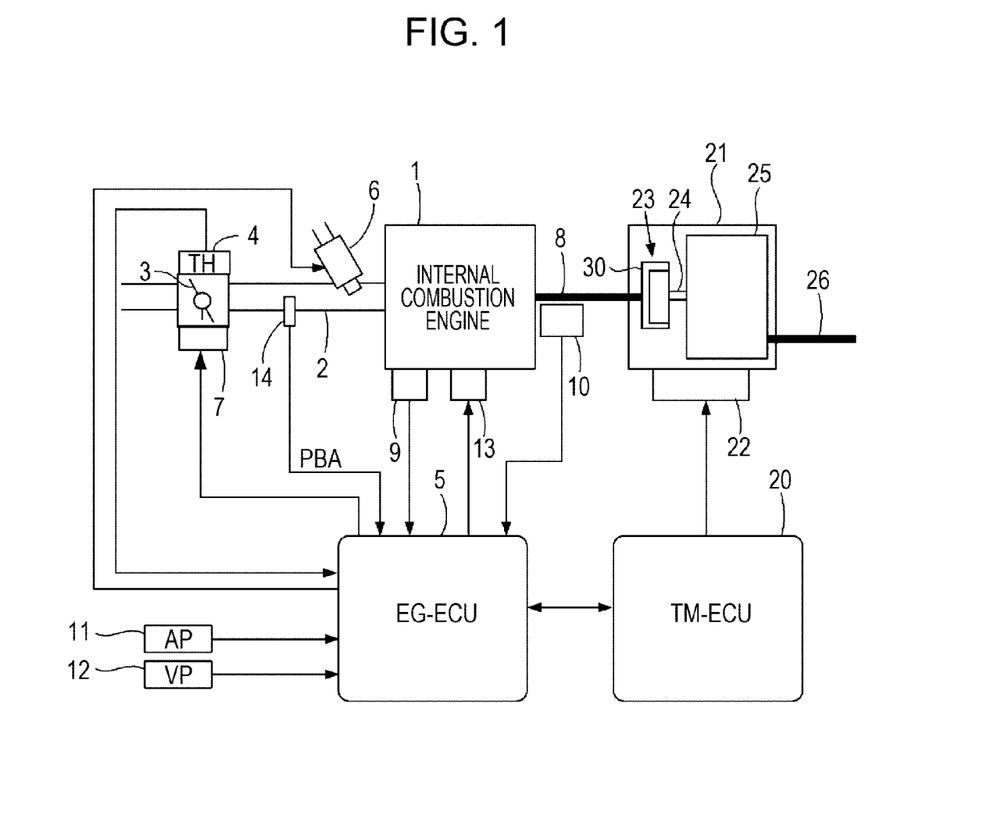
FIG. 1 illustrates the configurations of an internal combustion engine and an automatic transmission that drive a vehicle and a control apparatus for controlling the internal combustion engine and the automatic transmission according to an exemplary embodiment of the present technology.

Exemplary embodiments of the present technology are described below with reference to the accompanying drawings. FIG. 1 illustrates the configuration of an internal combustion engine and an automatic transmission of a vehicle and a control apparatus for controlling the internal combustion engine and the automatic transmission according to an exemplary embodiment of the present technology. The internal combustion engine (hereinafter simply referred to as an "engine") 1 has a throttle valve 3 disposed in an intake pipe 2. The throttle valve 3 includes a throttle valve position sensor 4 that detects a position TH of the throttle valve 3. A detection signal of the throttle valve position sensor 4 is supplied to an engine control electronic control unit (EG-ECU) 5. The throttle valve 3 has an actuator 7 connected thereto. The actuator 7 drives the throttle valve 3. The operation of the actuator 7 is controlled by the EG-ECU 5.

A fuel injection valve 6 is provided for each of cylinders at a position slightly upstream of an intake valve (not illustrated). Each of the fuel injection valves 6 is connected to a fuel pump (not illustrated). In addition, the fuel injection valve 6 is electrically connected to the EG-ECU 5. Thus, the valve open time of the fuel injection valve 6 is controlled by a signal output from the EG-ECU 5. In addition, a spark plug 13 provided on each of the cylinders is connected to the EG-ECU 5, which supplies a spark signal.

A portion of the intake pipe 2 downstream of the throttle valve 3 has an intake pressure sensor 14 mounted therein. The intake pressure sensor 14 detects an intake pressure PBA. The body of the engine 1 has a coolant temperature sensor 9 attached thereto. The coolant temperature sensor 9 detects an engine coolant temperature TW. Detection signals output from these sensors are supplied to the EG-ECU 5.

The EG-ECU 5 has a crank angle position sensor 10 connected thereto. The crank angle position sensor 10 detects the rotation angle of a crankshaft 8 of the engine 1 and supplies a signal in accordance with the rotation angle of the crankshaft 8 to the EG-ECU 5. The crank angle position sensor 10 includes a cylinder determination sensor, a TDC sensor, and a CRK sensor. The cylinder determination sensor outputs a pulse when the crank angle of a particular cylinder of the engine 1 reaches a predetermined crank angle (hereinafter, such a pulse is referred to as a "CYL pulse"). The TDC sensor outputs a TDC pulse when the crank angle reaches a value a predetermined crank angle before the top dead center (TDC) of each of the cylinders just before induction stroke starts. The CRK sensor outputs a CRK pulse at a predetermined crank angle cycle that is shorter than the TDC pulse (e.g., 6-degree cycle). The CYL pulse, the TDC pulse, and the CRK pulse are supplied to the EG-ECU 5. These signal pulses are used to control a variety of timings, such as the fuel injection timing and the spark timing, and detect the number of revolutions of the engine (the engine speed) NE.

The EG-ECU 5 has an acceleration sensor 11 and a vehicle speed sensor 12 connected thereto. The acceleration sensor 11 detects the position AP of an accelerator pedal of the vehicle driven by the engine 1. Hereinafter, the position AP is referred to as an "accelerator pedal position AP". The vehicle speed sensor 12 detects the vehicle speed VP of the vehicle driven by the engine 1. Detection signals output from the sensors are supplied to the EG-ECU 5.

The EG-ECU 5 includes an input circuit, a central processing unit circuit (hereinafter referred to as a "CPU"), a memory circuit, and an output circuit. For example, the input circuit reshapes the waveforms of the input signals output from the above-described sensors and the other sensors, changes the voltage levels to predetermined voltage levels, and converts an analog signal value into a digital signal value. The memory circuit stores a variety of calculation programs executed by the CPU and the results of calculation. The output circuit supplies drive signals to, for example, the actuator 7, the fuel injection valve 6, and the spark plug 13. The EG-ECU 5 performs control of the open time of the fuel injection valve 6 and a spark timing on the basis of the detection signals output from the sensors.

The crankshaft 8 of the engine 1 is connected to an automatic transmission mechanism 21. The automatic transmission mechanism 21 is controlled by a transmission control electronic control unit (TM-ECU) 20 via an oil pressure control unit 22. The automatic transmission mechanism 21 includes a torque converter 23, a main shaft (an input shaft) 24, a belt continuously variable transmission 25 (hereinafter simply referred to as a "CVT 25") including a forward/reverse switching mechanism, and an output shaft 26. The output shaft 26 drives the drive wheel of the vehicle via a power transfer mechanism (not illustrated). The torque converter 23 has a well-known configuration and includes a lockup clutch 30. The lockup clutch 30 is disposed between the crankshaft 8 and a main shaft 24. By engaging the lockup clutch 30, the crankshaft 8 is directly connected to the main shaft 24.

The TM-ECU 20 has a shift lever switch and a manual selection switch (not illustrated) connected thereto. Switching signals output from these switches are supplied to the TM-ECU 20. Like the EG-ECU 5, the TM-ECU 20 includes an input circuit, a CPU, a memory circuit, and an output circuit. The TM-ECU 20 is connected to the EG-ECU 5 and exchanges necessary information with each other. For example, the detected accelerator pedal position AP, vehicle speed VP, and engine speed NE are supplied from the EG-ECU 5 to the TM-ECU 20. In contrast, an engagement instruction signal for the lockup clutch, a signal indicating a gear ratio (a gear shift position), and a signal indicating a transmission mode are supplied from the TM-ECU 20 to the EG-ECU 5.

The automatic transmission mechanism 21 is configured so that the CVT 25 is operable in one of an automatic transmission mode and a manual transmission mode. In the automatic transmission mode, the TM-ECU 20 performs continuously variable automatic transmission control on the basis of the accelerator pedal position AP, the vehicle speed VP, and the engine speed NE. In the manual transmission mode, the TM-ECU 20 performs manual transmission control in accordance with an instruction received from the driver. The TM-ECU 20 further performs engagement control on the lockup clutch 30. In the manual transmission mode, the CVT 25 is controlled so that a gear ratio corresponding one of predetermined 1st gear to 7th gear is selected in accordance with an instruction from the driver.

According to the present exemplary embodiment, if a predetermined fuel cutoff driving condition is met, driving in a fuel cutoff mode in which supply of fuel to the engine 1 is temporarily cut off starts. Subsequently, if the fuel cutoff driving condition is not met, supply of fuel resumes (i.e., normal driving resumes).

Figure 2:
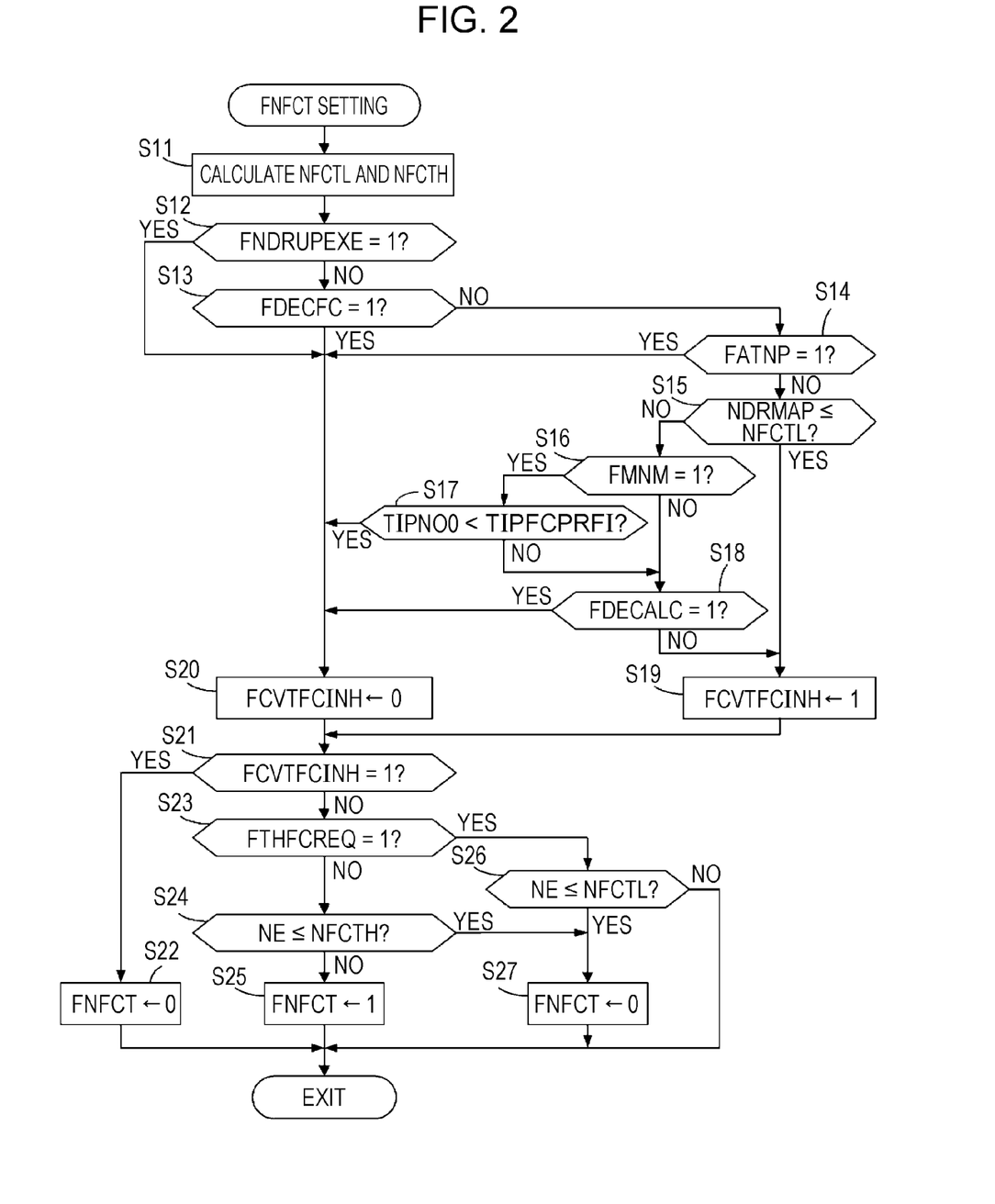
FIG. 2 is a flowchart of a control process performed by an electronic control unit illustrated in FIG. 1.

FIG. 2 is a flowchart of a process in which an engine speed condition included in the fuel cutoff driving condition is evaluated and, thereafter, an engine speed condition flag FNFCT is set. This process is performed by the EG-ECU 5 at predetermined time intervals during deceleration of the vehicle.

In the process, if the engine speed condition is met, the engine speed condition flag FNFCT is set to "1". In another process (not illustrated), the other conditions (conditions related to the intake pressure PBA, the vehicle speed VP, and the throttle valve position TH) are evaluated. Hereinafter, the other conditions are referred to as "other FC execution conditions". If the engine speed condition and the other FC execution conditions are all met, the fuel cutoff driving condition is met. However, if the engine speed condition is not met (the engine speed condition flag FNFCT is "0") although the other FC execution conditions are all met, the fuel cutoff driving condition is not met.

In the process, the driving in a fuel cutoff mode is inhibited (i.e., the engine speed condition flag FNFCT is maintained at "0") if it is estimated that although the driving in a fuel cutoff mode starts, the driving in a fuel cutoff mode ends in a short time (i.e., if it is estimated that short-time driving in a fuel cutoff mode is performed).

In step S11 illustrated in FIG. 2, each of a fuel cutoff completion determination rotational speed (a return rotational speed) NFCTL and a fuel cutoff start determination rotational speed NFCTH is set in accordance with the vehicle drive conditions. More specifically, the fuel cutoff completion determination rotational speed NFCTL and the fuel cutoff start determination rotational speed NFCTH are set in accordance with the vehicle speed VP, the gear ratio of the CVT 25, the engine coolant temperature TW, and an operation mode of an air conditioner (not illustrated) driven by the engine 1. The fuel cutoff completion determination rotational speed NFCTL is set so as to increase with decreasing vehicle speed VP. In addition, the fuel cutoff completion determination rotational speed NFCTL is set so as to increase with increasing gear ratio (as a lower gear ratio is selected). Furthermore, the fuel cutoff completion determination rotational speed NFCTL is set so as to increase with decreasing engine coolant temperature TW. Still furthermore, the fuel cutoff completion determination rotational speed NFCTL is set so as to be higher when the air conditioner is on than when the air conditioner is off. The fuel cutoff start determination rotational speed NFCTH is calculated by adding a predetermined rotational speed DNFC (e.g., 200 rpm) to the fuel cutoff completion determination rotational speed NFCTL.

In step S12, it is determined whether a rotational speed increase control flag NDRUPEXE is "1". According to the present exemplary embodiment, rotational speed increase control is performed when malfunction of the automatic transmission mechanism 21 (e.g., oil pressure control failure of the oil pressure control unit 22) is detected and if the lockup clutch 30 is disengaged, or when the lockup clutch 30 is disengaged due to malfunction of the lockup clutch 30 in order to increase the engine speed NE by the CVT 25. When the rotational speed increase control is performed, the rotational speed increase control flag NDRUPEXE is set to "1".

If the determination in step S12 is positive (YES), the processing immediately proceeds to step S20, where a fuel cutoff inhibition flag FCVTFCINH is set to "0". In general, the determination in step S12 is negative (NO) and, therefore, the processing proceeds to step S13, where it is determined whether a fuel cutoff execution flag FDECFC is "1". The fuel cutoff execution flag FDECFC is set to "1" if a fuel cutoff execution condition (the engine speed condition and the other FC execution conditions) is met. If the determination in step S13 is positive (YES), the processing proceeds to step S20.

However, if the determination in step S13 is negative (NO), it is determined whether an off-gear flag FATNP is "1" (step S14). The off-gear flag FATNP is set to "1" when the shift lever position is "N range" or "P range" and, thus, transfer of the engine output is disconnected. If the determination in step S14 is positive (YES), the processing proceeds to step S20.

However, if the determination in step S14 is negative (NO), that is, if the vehicle is in an in-gear mode in which the output of the engine is transferred to the drive wheel, it is determined whether a target engine speed NDRMAP is lower than or equal to the fuel cutoff completion determination rotational speed NFCTL (step S15).

Figure 3:
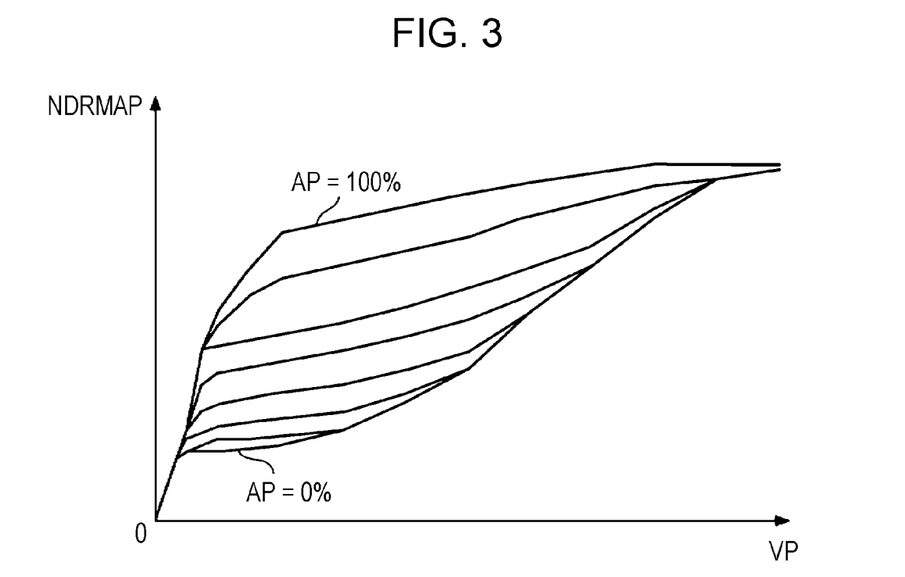
FIG. 3 is a map used for calculating a target rotational speed (NDRMAP) of the engine.

For example, the target engine speed NDRMAP is set in accordance with the vehicle speed VP and the accelerator pedal position AP, as illustrated in FIG. 3. In the map illustrated in FIG. 3, the target engine speed NDRMAP is set so as to increase with increasing vehicle speed VP. In addition, the target engine speed NDRMAP is set so as to increase with increasing accelerator pedal position AP. The target engine speed NDRMAP is calculated by the TM-ECU 20, and the calculated target engine speed NDRMAP is sent to the EG-ECU 5. The TM-ECU 20 controls the transmission gear ratio of the CVT 25 so that the detected engine speed NE is the same as the target engine speed NDRMAP.

If the determination in step S15 is positive (YES), that is, if the target engine speed NDRMAP is lower than or equal to the fuel cutoff completion determination rotational speed NFCTL, it is estimated that even when the driving in a fuel cutoff mode is started, the driving is completed in a short time. Accordingly, the fuel cutoff inhibition flag FCVTFCINH is set to "1" (step S19).

However, if the determination in step S15 is negative (NO), that is, if the target engine speed NDRMAP is higher than the fuel cutoff completion determination rotational speed NFCTL, it is determined in steps S16 to S18 whether the engine 1 is in a predetermined rapid deceleration mode in which the engine speed NE rapidly decreases. That is, in step S16, it is determined whether a manual transmission mode flag FMNM is "1". The manual transmission mode flag FMNM is set to "1" if the operation mode of the CVT 25 is the manual transmission mode.

If the determination in step S16 is negative (NO), that is, if the operation mode of the CVT 25 is the automatic transmission mode, it is determined whether a clutch engagement flag FDECALC is "1" (step S18). The clutch engagement flag FDECALC is set to "1" if the lockup clutch 30 is engaged. If the determination in step S18 is negative (NO), that is, if the lockup clutch 30 is disengaged, it is determined that the engine 1 is in the predetermined rapid deceleration mode. The processing proceeds to step S19, where the fuel cutoff inhibition flag FCVTFCINH is set to "1".

However, if determination in step S16 is positive (YES), that is, if the operation mode of the CVT 25 is the manual transmission mode, it is determined whether a gear shift position parameter TIPNO0 indicating the gear shift position selected in the manual mode is lower than a predetermined threshold value TIPFCPRFI (e.g., the 3rd gear) (step S17). If the determination in step S17 is positive (YES), the processing proceeds to step S20. However, if the determination in step S17 is negative (NO), the processing proceeds to step S18. Accordingly, when the manual transmission mode is selected and if the selected gear shift position is higher than or equal to the gear shift position corresponding to the predetermined threshold value and the lockup clutch 30 is disengaged, it is determined that the engine 1 is in the predetermined rapid deceleration mode. Thus, the fuel cutoff inhibition flag FCVTFCINH is set to "1" (step S19).

After step S19 or S20 is performed, the processing proceeds to step S21, where it is determined whether the fuel cutoff inhibition flag FCVTFCINH is "1". If the determination in step S21 is positive (YES), the engine speed condition flag FNFCT is set to "0" (step S22). However, if the determination in step S21 is negative (NO), it is determined whether a throttle valve full open FC request flag FTHFCREQ is "1" (step S23). The throttle valve full open FC request flag FTHFCREQ is set to "1" when the engine speed condition flag FNFCT is "1" and if the throttle valve 3 is completely closed.

If the determination in step S23 is positive (YES), it is determined whether the engine speed NE is lower than or equal to the fuel cutoff completion determination rotational speed NFCTL (step S26). If the determination in step S26 is negative (NO), the processing is immediately completed. However, if the determination in step S26 is positive (YES), the engine speed condition flag FNFCT is reset to "0".

When the determination in step S23 is negative (NO) and if the throttle valve 3 is not completely closed or if the engine speed condition flag FNFCT is "0", it is determined whether the engine speed NE is lower than or equal to the fuel cutoff start determination rotational speed NFCTH (step S24). If the determination in step S24 is negative (NO), that is, if the engine speed NE is higher than the fuel cutoff start determination rotational speed NFCTH, the engine speed condition flag FNFCT is set to "1" (step S25). However, if the determination in step S24 is positive (YES), the processing proceeds to step S27.

Figure 4:
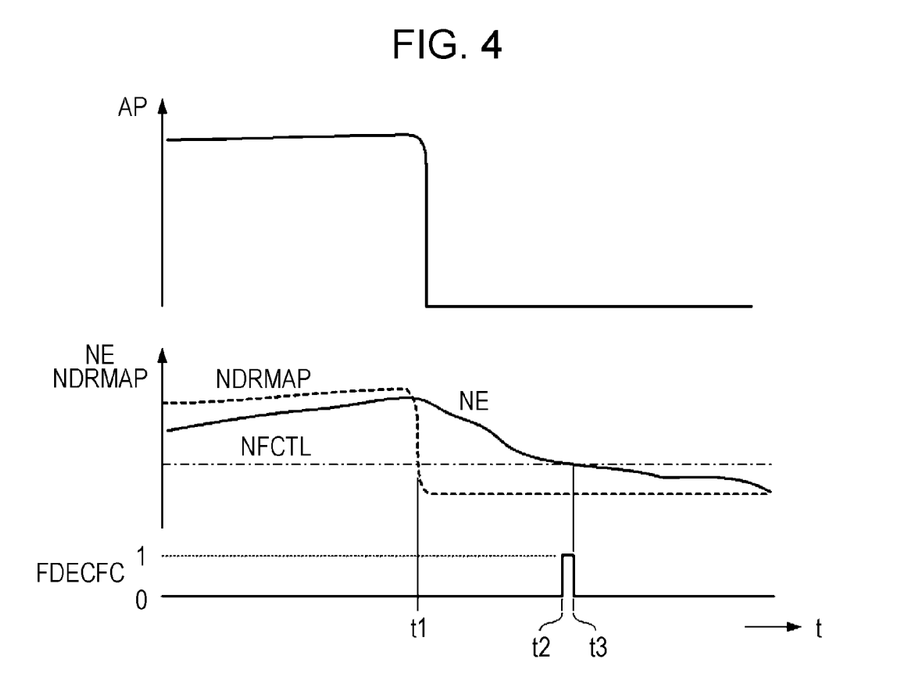
FIG. 4 is a timing diagram for illustrating short-time stoppage of fuel supply.

FIG. 4 is a timing diagram of a typical example in which short-time fuel cutoff driving is performed. FIG. 4 illustrates changes in the accelerator pedal position AP, the engine speed NE, the target engine speed NDRMAP, and the fuel cutoff execution flag FDECFC when steps S12 to S21 are removed from the processing illustrated in FIG. 3.

In this example, at a time t1 which is close to the time at which deceleration of the vehicle starts, the target engine speed NDRMAP is lower than or equal to the fuel cutoff completion determination rotational speed NFCTL. At a time t2, the engine speed condition and the other FC execution conditions are all met and, thus, driving in a fuel cutoff mode starts. Since, at a time t3, the engine speed NE is lower than or equal to the fuel cutoff completion determination rotational speed NFCTL, the driving in a fuel cutoff mode is completed (supply of fuel is resumed). If the short-time fuel cutoff driving in which a period of time from the start to the end of the driving in a fuel cutoff mode is short is performed, even torque shock that is not so large is experienced by the driver. Thus, the driver feels dissatisfied with the shock (i.e., the drivability decreases).

According to the processing illustrated in FIG. 3, since the fuel cutoff inhibition flag FCVTFCINH is set to "1" at the time t1, the short-time fuel cutoff driving is avoided and, thus, a decrease in the drivability can be prevented.

As described above, according to the present exemplary embodiment, the target engine speed NDRMAP of the engine 1 is calculated in accordance with the vehicle speed VP and the accelerator pedal position AP. The transmission gear ratio of the CVT 25 is controlled so that the engine speed NE, that is, the rotational speed of the output shaft of the engine 1 is close to the target engine speed NDRMAP. If the fuel cutoff execution condition is met during deceleration of the vehicle, the driving in a fuel cutoff mode is performed. During deceleration of the vehicle, before the fuel cutoff execution condition is met, it is estimated whether the driving in a fuel cutoff mode to be performed when the fuel cutoff execution condition is met is the short-time fuel cutoff driving on the basis of the target engine speed NDRMAP. If it is estimated that short-time fuel cutoff driving is performed, the driving in a fuel cutoff mode is inhibited. That is, if it is estimated that the driving in a fuel cutoff mode is completed in a short time, the driving in a fuel cutoff mode is inhibited before the driving in a fuel cutoff mode starts. Thus, stoppage of fuel supply and restart of fuel supply do not occur in a short time. As a result, a decrease in the drivability of the vehicle can be prevented.

More specifically, the fuel cutoff completion determination rotational speed (the return rotational speed) NFCTL is calculated in accordance with the drive conditions of the vehicle, such as the vehicle speed VP, the transmission gear ratio of the CVT 25, and the engine coolant temperature TW. During deceleration of the vehicle, if, before the fuel cutoff execution condition is met, the target engine speed NDRMAP is lower than or equal to the fuel cutoff completion determination rotational speed NFCTL, it is estimated that the driving in a fuel cutoff mode is completed in a short time. Thus, the driving in a fuel cutoff mode is inhibited (refer to steps S15 and S19 illustrated in FIG. 2). Since gear shift position control is performed so that the engine speed NE becomes close to the target engine speed NDRMAP, it can be estimated that the engine speed NE decreases to lower than the fuel cutoff completion determination rotational speed NFCTL in a short time if the target engine speed NDRMAP is lower than or equal to the fuel cutoff completion determination rotational speed NFCTL. Accordingly, in such a case, by inhibiting driving in a fuel cutoff mode, the short-time fuel cutoff driving can be reliably avoided.

Furthermore, if, during deceleration of the vehicle, the target engine speed NDRMAP is higher than the fuel cutoff completion determination rotational speed NFCTL before the fuel cutoff execution condition is met, it is determined in steps S16 to S18 (refer to FIG. 2) whether the predetermined rapid deceleration mode in which the rate of decrease in the engine speed NE is high occurs. Thereafter, it is estimated whether the short-time fuel cutoff driving is performed in accordance with whether the engine 1 is in the predetermined rapid deceleration mode. Accordingly, even when the target engine speed NDRMAP is higher than the fuel cutoff completion determination rotational speed NFCTL, the driving in a fuel cutoff mode is inhibited if it is highly likely that the short-time fuel cutoff driving is performed due to a rapid decrease in the engine speed NE caused by another factor. Thus, a decrease in the drivability of the vehicle can be prevented. In addition, it is determined whether the engine 1 is in the predetermined rapid deceleration mode by using a different determination condition in accordance with the operation mode of the CVT 25. For example, when the operation mode of the CVT 25 is the manual transmission mode and if the gear shift position parameter TIPNO0 is less than the predetermined threshold value TIPFCPRFI, that is, if a low gear shift position is selected, the rate of decrease in the engine speed NE is small. Accordingly, a correct determination cannot be made if a determination condition for the automatic transmission mode is used. Therefore, by making a determination using a different determination condition in accordance with the operation mode of the CVT 25, a correct determination can be made.

In addition, in the case in which the CVT 25 is operating in an automatic transmission mode, if the lockup clutch 30 is disengaged, it is determined that the engine 1 is in the predetermined rapid deceleration mode (refer to steps S16 and S18 illustrated in FIG. 2). When the automatic transmission mode is selected during deceleration of the vehicle and if the lockup clutch 30 is disengaged, the engine speed NE tends to rapidly decrease. Accordingly, by determining that the engine 1 is in the predetermined rapid deceleration mode, the short-time fuel cutoff driving can be avoided.

In contrast, in the case in which the CVT 25 is operating in the manual transmission mode, when the gear shift position parameter TIPNO0 indicating the selected gear shift position is higher than or equal to the predetermined threshold value TIPFCPRFI, that is, when the selected gear shift position is the same as the gear shift position corresponding to the predetermined threshold value TIPFCPRFI or higher and if the lockup clutch 30 is disengaged, it is determined that the engine 1 is in the predetermined rapid deceleration mode (steps S16 and S17). However, if the gear shift position parameter TIPNO0 is lower than the predetermined threshold value TIPFCPRFI, that is, if the selected gear shift position is lower than the predetermined gear shift position, the rate of decrease in the engine speed NE is low. Accordingly, in such a case, driving in a fuel cutoff mode is not inhibited. In this manner, the fuel efficiency can be increased.

Alternatively, if the lockup clutch 30 malfunctions and, thus, the lockup clutch 30 is disengaged or if malfunction of the automatic transmission mechanism 21 is detected and, at that time, the lockup clutch 30 is disengaged, rotational speed increase control is performed so that the rotational speed of the input shaft of the CVT 25 is increased. During the rotational speed increase control, control is performed so that the driving in a fuel cutoff mode is not inhibited. If rotational speed increase control is performed so that the engine speed NE is increased by the CVT 25, the engine speed NE does not rapidly decrease. Thus, it is highly unlikely that the short-time fuel cutoff driving is performed. Accordingly, by not inhibiting the driving in a fuel cutoff mode, the fuel efficiency can be increased. In addition, failure diagnosis to be performed during the driving in a fuel cutoff mode can be reliably performed.

According to the present exemplary embodiment, the torque converter 23 including the lockup clutch 30 corresponds to the engagement mechanism. The EG-ECU 5 functions as a fuel supply stop unit, an estimation unit, and an inhibition unit. The TM-ECU 20 functions as a target rotational speed calculation unit, a transmission control unit, and a rotational speed increase control unit. More specifically, steps S12 to S18 illustrated in FIG. 2 correspond to the estimation unit, and steps S19, S21, and S22 correspond to the inhibition unit.

Note that the present technology is not limited to the above-described exemplary embodiment, and various modifications can be made. For example, while the above-described embodiment has been described with reference to an automatic transmission configured as a continuously variable transmission, the present technology is applicable to an apparatus for controlling a vehicle including a normal automatic transmission having a large number of shift gears (e.g., a 7 or 8-speed automatic transmission), since the transmission gear control can be performed so that the engine speed NE is close to the target engine speed NDRMAP.

In addition, the transfer mechanism disposed between the internal combustion engine and the automatic transmission is not limited to a torque converter having a lockup clutch. For example, the transfer mechanism may be formed from only a clutch, as described in Japanese Unexamined Patent Application Publication No. 2003-341387.

According to a first aspect of the present application, an apparatus for controlling a vehicle includes an internal combustion engine (1), an automatic transmission (25), a transfer mechanism (23) disposed between an output shaft (8) of the internal combustion engine and an input shaft (24) of the automatic transmission (25), where the vehicle is driven by transferring the output of the internal combustion engine to a drive wheel via the transfer mechanism (23) and the automatic transmission (25), a target rotational speed calculation unit configured to calculate a target rotational speed (NDRMAP) of the internal combustion engine in accordance with a drive condition of the vehicle, a transmission control unit configured to change a transmission gear ratio of the automatic transmission (25) so that a rotational speed (NE) of the output shaft of the internal combustion engine is close to the target rotational speed (NDRMAP), a fuel supply stop unit configured to stop supplying fuel to the internal combustion engine if a predetermined fuel supply stop condition is met during deceleration of the vehicle, an estimation unit configured to estimate, before the predetermined fuel supply stop condition is met during deceleration of the vehicle, whether stoppage of fuel supply to be performed when the predetermined fuel supply stop condition is met is a predetermined short-time stoppage that lasts a predetermined short time on the basis of the target rotational speed (NDRMAP), and an inhibition unit configured to inhibit the stoppage of fuel supply if the stoppage of fuel supply is estimated to be the predetermined short-time stoppage. That is, if it is estimated that the stoppage of fuel supply is the predetermined short-time stoppage, the stoppage of fuel supply is inhibited before the stoppage of fuel supply starts. Accordingly, the stoppage of fuel supply and restart of fuel supply are not performed in a short period of time. In this manner, a decrease in the drivability of the vehicle can be prevented.

According to a second aspect of the present application, the estimation unit of the apparatus according to the first aspect of the present application can include a return rotational speed calculating unit configured to calculate a return rotational speed (NFCTL) serving as a threshold value of the engine speed used for determining a point in time at which the stoppage of fuel supply ends in accordance with the drive condition of the vehicle. Before the predetermined fuel supply stop condition is met during the deceleration of the vehicle, the estimation unit can estimate that the stoppage of fuel supply is the predetermined short-time stoppage if the target rotational speed (NDRMAP) is lower than or equal to the return rotational speed (NFCTL). Since the transmission gear control is performed so that the engine speed is close to the target rotational speed, it can be estimated that if the target rotational speed is lower than or equal to the return rotational speed, the engine speed decreases to lower than the return rotational speed in a short time. Accordingly, by inhibiting the stoppage of fuel supply in such a case, the stoppage of fuel supply occurring in a short time can be reliably prevented.

According to a third aspect of the present application, the transfer mechanism of the apparatus according to the second aspect of the present application can be formed from a fluid coupling (23) with an engagement mechanism (30). The automatic transmission (25) can be configured to be operable in one of a manual transmission mode in which the driver selects gear changes and a normal automatic transmission mode. The estimation unit can include a rapid deceleration mode determination unit configured to detect a predetermined rapid deceleration mode in which the rate of decrease in the engine speed (NE) is high. If the target rotational speed (NDRMAP) is higher than the return rotational speed (NFCTL) before the predetermined fuel supply stop condition is met during the deceleration of the vehicle, the estimation unit can perform the estimation in accordance with whether the engine is in the predetermined rapid deceleration mode, and the rapid deceleration mode determination unit can determine whether the predetermined rapid deceleration mode occurs using determination conditions that differ from each other in accordance with the operation mode of the automatic transmission. Accordingly, even in the case in which the target rotational speed is higher than the return rotational speed, if it is highly likely that the engine speed rapidly decreases due to another factor and, thus, the short-time stoppage of fuel supply occurs, the stoppage of fuel supply is inhibited. In this manner, a decrease in the drivability of the vehicle can be prevented. Note that the determination as to whether the predetermined rapid deceleration mode occurs can be made by using a determination condition in accordance with the operation mode of the automatic transmission. For example, when the operation mode of the automatic transmission is a manual transmission mode, the rate of decrease in the engine speed is low if a low gear shift position is selected. Accordingly, correct determination cannot be made if a determination condition for the automatic transmission mode is used. Therefore, by determining whether the predetermined rapid deceleration mode occurs using a determination condition in accordance with a different operation mode of the automatic transmission, correct determination can be made.

According to a fourth aspect of the present application, when the automatic transmission (25) is operating in the automatic transmission mode and if the engagement mechanism (30) is disengaged, the rapid deceleration mode determination unit of the apparatus according to the third aspect of the present application can determine that the engine is in the predetermined rapid deceleration mode. When the automatic transmission is operating in the automatic transmission mode and if the engagement mechanism is disengaged, the engine speed tends to rapidly decrease. Accordingly, by determining that the engine is in the predetermined rapid deceleration mode, the short-time stoppage of fuel supply can be prevented.

According to a fifth aspect of the present application, when the automatic transmission (25) is operating in the manual transmission mode and if a selected transmission gear is higher than a predetermined transmission gear and the engagement mechanism (30) is disengaged, the rapid deceleration mode determination unit of the apparatus according to the third aspect of the present application can determine that the engine is in the predetermined rapid deceleration mode. If the transmission gear is a predetermined transmission gear or lower, the rate of decrease in the engine speed is low. Accordingly, in such a case, by not inhibiting the stoppage of fuel supply, the fuel efficiency can be increased.

According to a sixth aspect of the present application, the apparatus according to any one of the third to fifth aspects of the present application can further include a rotational speed increase control unit configured to control the automatic transmission (25) so that a rotational speed of the input shaft of the automatic transmission (25) increases if the engagement mechanism (30) is disengaged due to malfunction or if the automatic transmission (25) malfunctions and the engagement mechanism (30) is disengaged and a malfunction processing unit configured to perform control so that while the rotational speed increase control unit is operating, the stoppage of fuel supply is not inhibited by the inhibition unit. When rotational speed increase control is performed by the automatic transmission so that the engine speed increases, the engine speed does not rapidly decrease. Accordingly, it is highly unlikely that short-time stoppage of fuel supply is performed. Therefore, the fuel efficiency can be increased by not inhibiting the stoppage of fuel supply. In addition, failure diagnosis that is to be performed during stoppage of fuel supply can be reliably performed.

Obviously, numerous modifications and variations of the present invention are possible in light of the above teachings. It is therefore to be understood that within the scope of the appended claims, the invention may be practiced otherwise than as specifically described herein.

What is claimed is:

1. An apparatus for controlling a vehicle, comprising:
a target rotational speed calculator configured to calculate a target rotational speed of an internal combustion engine in accordance with a drive condition of the vehicle;
a transmission controller configured to change a transmission gear ratio of an automatic transmission so that a rotational speed of an output shaft of the internal combustion engine approaches the target rotational speed, the output shaft of the internal combustion engine being connected to the automatic transmission via a transfer mechanism;
a fuel supply stop controller configured to stop supplying fuel to the internal combustion engine to start a fuel cutoff mode if a predetermined fuel supply stop condition is satisfied during deceleration of the vehicle;
an estimator configured to estimate, before the predetermined fuel supply stop condition is satisfied during deceleration of the vehicle, whether a stoppage of fuel supply is a predetermined short-time stoppage based on the target rotational speed; and
an inhibition controller configured to control the fuel supply stop controller to inhibit the stoppage of fuel supply to be performed by the fuel supply stop controller if the stoppage of fuel supply is to be the predetermined short-time stoppage that lasts a predetermined short time,
wherein the inhibition controller is configured to control the fuel supply stop controller to inhibit the stoppage of fuel supply before the fuel cutoff mode starts.

2. The apparatus according to claim 1, wherein the estimator includes a return rotational speed calculator configured to calculate a return rotational speed serving as a threshold value of the engine speed used for determining the time at which the stoppage of fuel supply ends.

3. An apparatus for controlling a vehicle, comprising:
a target rotational speed calculator configured to calculate a target rotational speed of an internal combustion engine in accordance with a drive condition of the vehicle;
a transmission controller configured to change a transmission gear ratio of an automatic transmission so that a rotational speed of an output shaft of the internal combustion engine approaches the target rotational speed, the output shaft of the internal combustion engine being connected to the automatic transmission via a transfer mechanism;
a fuel supply stop controller configured to stop supplying fuel to the internal combustion engine if a predetermined fuel supply stop condition is satisfied during deceleration of the vehicle;
an estimator configured to estimate, before the predetermined fuel supply stop condition is satisfied during deceleration of the vehicle, whether the stoppage of fuel supply is a predetermined short-time stoppage based on the target rotational speed
an inhibition controller configured to control the fuel supply stop controller to inhibit stoppage of fuel supply to be performed by the fuel supply stop controller if the stoppage of fuel supply is to be the predetermined short-time stoppage that lasts a predetermined short time,
wherein the estimator includes a return rotational speed calculator configured to calculate a return rotational speed serving as a threshold value of the engine speed used for determining a point in time at which the stoppage of fuel supply ends in accordance with the drive condition of the vehicle, and
wherein before the predetermined fuel supply stop condition is satisfied during the deceleration of the vehicle, the estimator estimates that the stoppage of fuel supply is the predetermined short-time stoppage if the target rotational speed is lower than or equal to the return rotational speed.

4. The apparatus according to claim 3, wherein the transfer mechanism is formed from a fluid coupling with an engagement mechanism,
wherein the automatic transmission is operable in one of a manual transmission mode in which a driver selects gear changes and a normal automatic transmission mode,
wherein the estimator includes a rapid deceleration mode determination controller configured to detect a predetermined rapid deceleration mode in which a rate of decrease in the engine speed is high,
wherein before the predetermined fuel supply stop condition is satisfied during the deceleration of the vehicle, if the target rotational speed is higher than the return rotational speed, the estimator performs the estimation in accordance with whether the engine is in the predetermined rapid deceleration mode, and
wherein the rapid deceleration mode determination controller determines whether the predetermined rapid deceleration mode occurs using determination conditions that differ from each other in accordance with an operation mode of the automatic transmission.

5. The apparatus according to claim 4, wherein when the automatic transmission is operating in the automatic transmission mode and if the engagement mechanism is disengaged, the rapid deceleration mode determination controller determines that the engine is in the predetermined rapid deceleration mode.

6. The apparatus according to claim 5, further comprising:
a rotational speed increase controller configured to control the automatic transmission so that a rotational speed of an input shaft of the automatic transmission increases if the engagement mechanism is disengaged due to malfunction or if the automatic transmission malfunctions and the engagement mechanism is disengaged; and
a malfunction processing controller configured to perform control so that while the rotational speed increase controller is operating, the stoppage of fuel supply is not inhibited by the inhibition controller.

7. The apparatus according to claim 4, wherein when the automatic transmission is operating in the manual transmission mode and if a selected transmission gear is higher than a predetermined transmission gear and the engagement mechanism is disengaged, the rapid deceleration mode determination controller determines that the engine is in the predetermined rapid deceleration mode.

8. The apparatus according to claim 7, further comprising:
a rotational speed increase controller configured to control the automatic transmission so that a rotational speed of an input shaft of the automatic transmission increases if the engagement mechanism is disengaged due to malfunction or if the automatic transmission malfunctions and the engagement mechanism is disengaged; and
a malfunction processing controller configured to perform control so that while the rotational speed increase controller is operating, the stoppage of fuel supply is not inhibited by the inhibition controller.

9. The apparatus according to claim 4, further comprising:
a rotational speed increase controller configured to control the automatic transmission so that a rotational speed of an input shaft of the automatic transmission increases if the engagement mechanism is disengaged due to malfunction or if the automatic transmission malfunctions and the engagement mechanism is disengaged; and
a malfunction processing controller configured to perform control so that while the rotational speed increase controller is operating, the stoppage of fuel supply is not inhibited by the inhibition controller.

10. An apparatus for controlling a vehicle, comprising:
target rotational speed calculation means for calculating a target rotational speed of an internal combustion engine in accordance with a drive condition of the vehicle;
transmission control means for changing a transmission gear ratio of an automatic transmission so that a rotational speed of an output shaft of the internal combustion engine approaches the target rotational speed, the output shaft of the internal combustion engine being connected to the automatic transmission via a transfer mechanism;
fuel supply stop control means for stopping supplying fuel to the internal combustion engine to start a fuel cutoff mode if a predetermined fuel supply stop condition is satisfied during deceleration of the vehicle;
an estimation means for estimating, before the predetermined fuel supply stop condition is satisfied during deceleration of the vehicle, whether a stoppage of fuel supply is a predetermined short-time stoppage based on the target rotational speed; and
inhibition control means for controlling the fuel supply stop control means to inhibit the stoppage of fuel supply to be performed by the fuel supply stop controller if the stoppage of fuel supply is to be the predetermined short-time stoppage that lasts a predetermined short time,
wherein the inhibition control means is configured to control the fuel supply stop control means to inhibit the stoppage of fuel supply before the fuel cutoff mode starts.

11. The apparatus according to claim 10, wherein the estimation means includes a return rotational speed calculation means for calculating a return rotational speed serving as a threshold value of the engine speed used for determining the point in time at which the stoppage of fuel supply ends.

12. A method for controlling a vehicle, comprising:
calculating a target rotational speed of an internal combustion engine in accordance with a drive condition of the vehicle;
changing a transmission gear ratio of an automatic transmission so that a rotational speed of an output shaft of the internal combustion engine approaches the target rotational speed;
stopping supplying fuel to the internal combustion engine to start a fuel cutoff mode if a predetermined fuel supply stop condition is satisfied during deceleration of the vehicle;
estimating, before the predetermined fuel supply stop condition is satisfied during deceleration of the vehicle, whether the stopping supply fuel is to be a predetermined short-time stoppage based on the target rotational speed; and
inhibiting the stopping supplying fuel if the stopping supplying fuel is to be the predetermined short-time stoppage that lasts a predetermined short time,
wherein the inhibiting of the stopping supplying fuel occurs before the fuel cutoff mode starts.

13. The method according to claim 12, further comprising calculating a return rotational speed that serves as a threshold value of the engine speed used for determining the point in time at which the stoppage of fuel supply ends.

* * * * *